March 27, 1934.  C. A. CAMPBELL  1,952,532
AIR BRAKE
Filed July 27, 1932   2 Sheets-Sheet 1

6-E DISTRIBUTING VALVE

Inventor
Charles A. Campbell
By
Attorneys

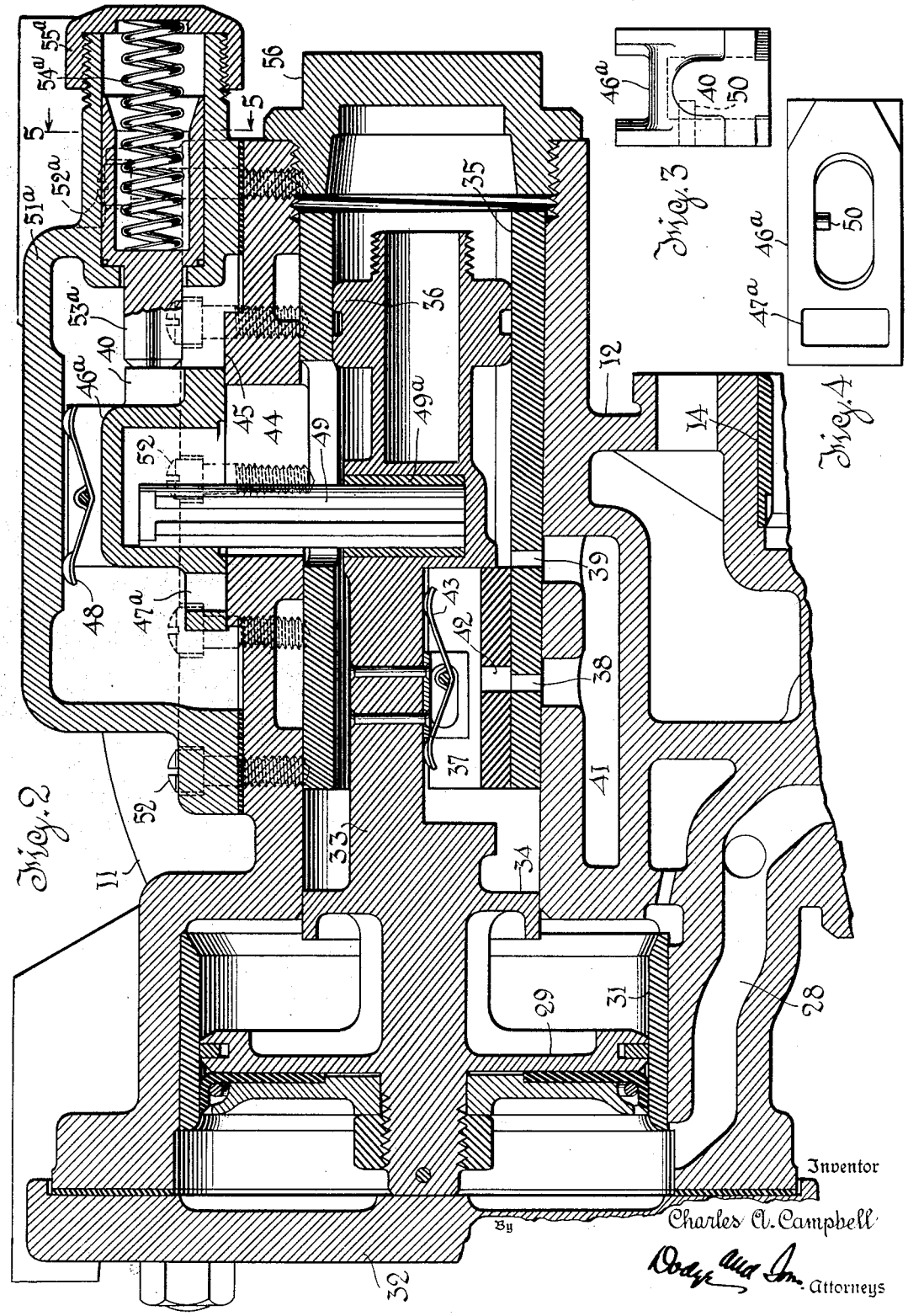

Patented Mar. 27, 1934

1,952,532

UNITED STATES PATENT OFFICE 1,952,532

AIR BRAKE

Charles A. Campbell, Watertown, N. Y., assignor to The New York Air Brake Company, a corporation of New Jersey Application July 27, 1932, Serial No. 625,095

9 Claims. (Cl. 303—40)

This invention relates to air brakes, and particularly to what are known as distributing valves. Generally stated, a single distributing valve is customarily used to control the locomotive and tender brakes, and takes the place of a number of triple valves and auxiliary reservoirs formerly used for this purpose.

The distributing valve includes an equalizing portion which is analogous to a triple valve and which is associated with a pressure chamber, the analogue of the auxiliary reservoir. The equalizing portion acts to establish in the application cylinder, brake applying pressures which do not act directly in the brake cylinders but which actuate the application piston to admit main reservoir air to the brake cylinders. In service applications the application cylinder is increased in volume by connection with a chamber called the application chamber.

The application piston is interposed between the application cylinder and a valve chamber subject to brake cylinder pressure, and the piston shifts in response to differentials between these pressures to open either an admission valve or an exhaust valve and thus modify brake cylinder pressure in accordance with the pressure in the application cylinder.

In the 6 E distributing valve and others of closely similar construction and function, such as the 6, 6A and 14, the exhaust valve is of the slide type and has lost motion relatively to the application piston. The admission valve is of the slide type and is positively connected with the application piston by the drive pin. The construction is such that at low brake cylinder pressures the admission slide valve is subject to a heavy pressure differential, and unless kept clean and well lubricated, is subject to great friction. This friction increases as brake cylinder pressure falls, and falling brake cylinder pressure obviously entails a lower releasing pressure differential on the application piston. The effect is to cause the application piston to stick in lap position when brake cylinder pressures are low, say of the order of 6 pounds per square inch or less. This failure of locomotive and tender brakes to release is a familiar problem and has defied efforts hitherto made to eliminate it. The heating and loosening of the tires on locomotives which results from the failure of the brakes to release completely, is a source of danger and expense.

The present invention provides a means insuring ready release of even light applications in distributing valves of the 6 E type. It not only permits the economical modification of existing valves to accommodate the improvements, but it makes possible modification of the construction of new valves in such a way as to retain the major operating parts and most of the manufacturing tools, fixtures and processes. Consequently, aside from the improved operative characteristics, the proposed modification has decided economical advantages.

The changes are confined to the application portion and involve the substitution for the present inlet slide valve of a somewhat similar inlet slide valve arranged to have lost motion relatively to the application piston. The yielding stop heretofore used in conjunction with the piston stem is eliminated and in lieu thereof a yielding stop is arranged to coact directly with the inlet slide valve. The change in the inlet slide valve and the provision of the stop entail the provision of a new housing cap for the inlet slide valve.

I prefer, though it is not essential to the invention, to provide a stainless steel bushing for the drive pin used to connect the application piston stem with the inlet slide valve. The purpose of this is to ensure a tight fit and ready removability of the pin. The modification of an existing valve, according to the invention therefore, entails merely the removal of the housing cap and slide valve, and the substitution of a new housing cap with yielding stop and new slide valve. The yielding stop mounted in the piston stem is simply removed.

The lost motion between the piston stem and the inlet slide valve is so proportioned that when the device functions to make an application, and as brake cylinder pressure approaches the pressure in the application cylinder, the yielding stop urges the inlet valve to its lap position, and in doing so moves the application piston. Thereafter if pressure in the application chamber is reduced to release the brakes, the application piston moves freely and independently of both valves until it engages the exhaust valve. The momentum at the time of engagement is sufficient to insure starting of the exhaust valve, and the parts move freely to exhaust position because the inlet valve is not moved at all and the exhaust valve is seated merely by whatever pressure then exists in the brake cylinder. If this pressure be high there will be a correspondingly high differential of pressure in the releasing direction on the application piston.

The preferred embodiment of the invention and the manner of modifying existing valves will now be described in connection with the accompanying drawings, in which—

Fig. 2 is a similar axial section showing the application portion after modification according to the present invention. No changes are made in the equalizing portion, and hence this portion is broken away.

Fig. 3 is an end elevation of the inner (right hand) end of the application valve used according to the present invention.

Fig. 4 is a face view thereof.

Figure 1:
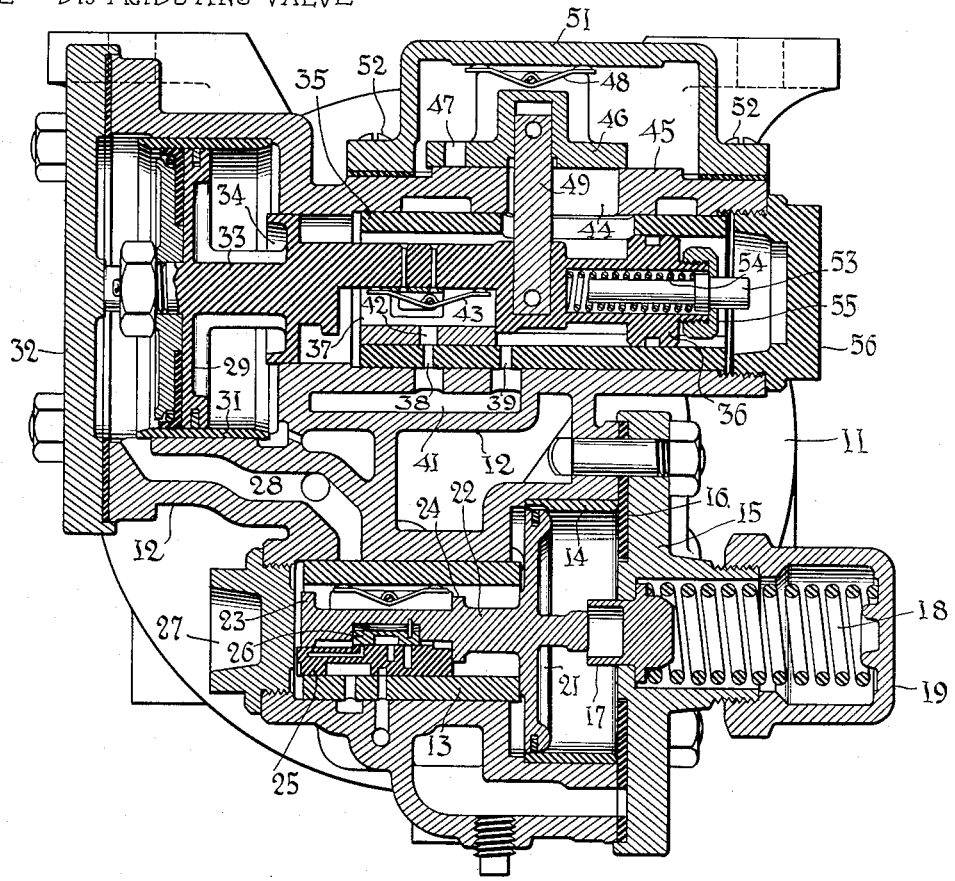
Fig. 1 is a vertical axial section through the application portion and equalizing portion of a 6 E distributing valve as at present constructed.

Referring first to Fig. 1, the present standard construction will be described.

11 represents the ordinary double chamber reservoir customarily used with the 6 E equipment. This reservoir is subdivided into two isolated volumes, the larger of which serves as the pressure chamber and the smaller of which serves as the application chamber. Bolted to the head of the double chamber reservoir 11 is a body casting 12 which houses the cylinder and valve chamber of the equalizing portion and the cylinder and valve chamber of the application portion.

In the lower portion of the body 12 is the valve chamber of the equalizing portion which is provided with the usual valve chamber bushing 13, and axially alined with this chamber is the cylinder which is lined with the cylinder bushing 14. The open end of the cylinder is closed by a cap 15 which is sealed by means of gasket 16, the gasket 16 projecting in far enough to serve as a seat for the equalizing piston in emergency position.

Guided in the head 15 is the graduating stop or stem 17 which is yieldingly supported by the coil graduating spring 18. The outer end of the spring 18 is sustained by the spring cup 19 which is threaded to the cap 15. The equalizing piston 21 works in the bushing 14 and is provided with the usual stem 22 which is guided at its inner end by a spider 23 working in the bushing 13. The stem 22 is further provided with a collar 24 between which and the spider 23 is confined the usual slide valve 25, a limited amount of lost motion being permitted to the slide valve. The graduating valve 26 is closely confined within a notch in the stem 22 and works on a seat formed on the upper portion of the slide valve 25. The seat for the slide valve 25 is formed in the lower portion of the bushing 13, and the bushing, slide valve and graduating valve are ported according to standard practice and require no detailed explanation. The end of the valve chamber is closed by a screw plug 27.

The space outside (to the right) of the equalizing piston 21 is connected to the brake pipe. The space to the left including the space within the valve chamber bushing 13, is connected to the pressure chamber described as formed within the reservoir 11. In release position the slide valve serves to exhaust the application chamber and thus to vent pressure through port 28 from the space to the left of the application piston 29. In release position the pressure chamber is charged from the brake pipe by flow around the edge of piston 21 through a conventional charging groove formed in the bushing 14, and clearly shown in the drawings. In application positions the exhaust port and charging groove are closed and the slide valve functions to admit air from the pressure chamber to the application cylinder to develop in the application cylinder a pressure which rises as pressure chamber pressure falls. The flow terminates when pressure chamber pressure falls to or slightly below equalization with the brake pipe pressure. It will be observed, therefore, that the parts numbered 13-27 inclusive function in a manner analogous to that of a conventional triple valve and these parts make up what is known as the equalizing portion of the distributing valve.

The application piston 29 works in a cylinder bushing 31 and in order to prevent all leakage of pressure from the application cylinder past the application piston, the piston 29 is not only provided with a snap ring but is also provided with a cup leather or gasket. The details of construction are clearly illustrated and need not be set forth in detail, as they conform to known practice.

The end of the application cylinder, to the left of piston 29, is closed by a removable cap 32. The piston stem 33 is formed with a baffle 34 which works in the bore of the slide valve chamber and performs its ordinary function.

The slide valve chamber contains a valve chamber bushing 35. The inner end of the stem 33 is guided in this bushing by means of a spider or head 36 formed with spiral grooves to prevent the spider from acting as a piston. The bushing 35 is formed with a seat for the exhaust valve 37 and in this seat are formed two exhaust ports 38, 39, which lead to an atmospheric exhaust passage 41. The valve 37 is provided with a through port 42 to coact with a port 38 and exposes the port 39 by moving beyond the same in release position. The valve 37 is urged to its seat by bow-spring 43 which reacts against the stem 33, and has lost motion relatively to the stem 33, the confining notch in the stem being longer than the valve.

A slot 44 is formed through the upper part of the bushing 35 and body 12 and terminates in a valve seat 45 for the inlet slide valve 46. The slide valve 46 is provided with an admission port 47 which when the piston 29 moves inward to its admission position registers with the slot 44. The valve 46 is held to its seat by a bow spring 48 and is positively connected with the stem 3 by means of a so-called drive pin 49 which forms a slip fit with a socket in the stem 33 and a free fit with the socket in the valve 46. The valve 46 is enclosed in a cap or housing 51 which is connected to the body 12 by a plurality of screws 52. The space within the cap 51 is connected with the main reservoir, the connection not being visible in the drawings because it is made through cores in the body 12. The space within the bushing 35 is connected with the brake cylinder, this connection being also invisible in the drawings.

The right or inner end of the stem 33 is counter-bored as shown, to receive a sliding stop 53 which is urged outward by a coil compression spring 54 and which is retained and limited in its outward motion by a flanged nut 55 threaded on to the end of the stem 33. Before the port 47 commences to open by overtraveling the end of the slot 44, the stop 53 engages the threaded plug 56 which closes the right hand end of the valve chamber. The function of the spring 54 is to assist the lapping movement of the piston 29 and valve 46.

It will be observed that since the space within the bushing 35 is subject to brake cylinder pressure, the valve 46 is held to its seat by the pressure differential between main reservoir pressure and brake cylinder pressure. It follows that the lower brake cylinder pressure is, the higher the effective pressure seating the valve 46. To release the brakes the piston 29 must move to the left, and is in full release position in Fig. 1. After the valve 46 has lapped, the spring 54 ceases to have any effect and the effective force on the piston 29 in a releasing direction is the differential between brake cylinder pressure and atmospheric pressure. Atmospheric pressure would then exist to the left of the piston 29 since the equalizing piston is assumed to have moved to full release position. Consequently at a time when the valve 46 is most heavily loaded, and offers its maximum frictional resistance to motion, the available pressure to shift the piston 29 in a releasing direction is inherently low.

Referring now to Fig. 2, identical parts are given the same reference numerals as in Fig. 1. To convert the valve of Fig. 1 according to the present invention, the stop 53, spring 54 and retaining nut 55 are removed. In a new valve it would be unnecessary to counterbore the end of the stem 33 or to thread it, but in Fig. 2 the mechanism is shown as it would appear if the parts 53, 54, 55 were removed. The cap 51 and the valve 46 are discarded. The stem 49 instead of being fitted directly in the bronze piston stem 33 is mounted in a stainless steel bushing 49a, to reduce its tendency to work loose and to insure its ready withdrawal when desired. This detail, however, is optional and can be omitted.

In place of the cap 51 there is substituted a cap 51a which includes a guideway for a yielding stop 53a. This stop 53a reacts directly with a boss 40 formed on a modified slide valve 46a which takes the place of the slide valve 46, and which has a port 47a essentially the same in form and function as the port 47. The shifting stop 53a is urged inward to its left hand limit of motion by a coil compression spring 54a which is retained by a removable threaded cap 55a. The valve 46a instead of confining the upper end of the drive pin 49 closely, is formed with a longitudinal slot which provides substantial lost motion between the valve 46a and the piston 29. The pin 50 which appears in this elongated slot in Fig. 4 is merely the conventional positioning pin to prevent the valve from being put in place backward. It does not limit or affect the lost motion between the pin 49 and the slide valve 46a.

The same bow-spring 48 may be used for the valve 46a. The cap 51a is held in place by the same screws 52 except that at the right hand end two somewhat longer screws must be substituted, as indicated at 52a.

Figure 5:
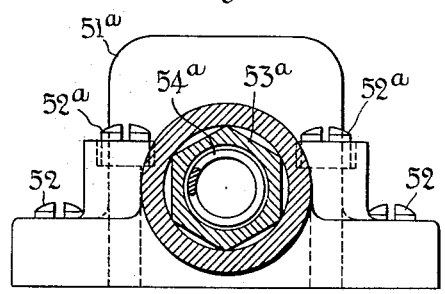
Fig. 5 is a section on the line 5—5 of Fig. 2.

The sliding stop 53a, at that point where it is guided in the cap 52a, is given a polygonal configuration, as clearly indicated in Fig. 5, the purpose being to reduce friction by affording only line contacts and to vent the space to the right of the stop 53a. It will be observed that the exhaust valve 37 has substantial lost motion between shoulders on the stem 33 and this lost motion, and the lost motion of the valve 46a, and the extent of motion of the yielding stop 53a, are carefully coordinated.

In making an application of the brakes, the piston 29 moves to the right, shifting the valve 46a until port 47a registers with slot 44. This results in an increase of pressure within the bushing 35 and when this pressure approaches equalization with application cylinder pressure acting to the left of piston 29, the spring 54a will start to restore the valve 46a to its lapped position. It is the intention that the spring 54a will shift the valve 46a so that the valve will follow the drive pin 49 if the piston 29 moves to the left, but should the valve stick, or not follow the drive pin, the drive pin will reach the opposite end of the slot in the valve 46a and force the valve 46a to closed position just as the exhaust valve 37 is about to open the exhaust ports 38 and 39. Consequently, there is a definite lap position in which both valves are closed. Conversely, on motion of the piston to the right, the exhaust valve 37 moves to close the exhaust port before the inlet valve starts to admit pressure fluid from the main reservoir to the brake cylinder.

In the prior art structure shown in Fig. 1, the slide valve 46 must continue to move with the piston 29 even if the inlet valve 46 lap the inlet port, but in the construction shown in Figs. 2 to 5, the inlet valve moves to lap position on initial motion of the piston toward release position, and when it reaches lap position it comes to rest, because the stop 53a is limited in its motion and can not shift the valve 46a further. It follows that if the piston 29 moves further in a releasing direction, the stem 33 merely picks up the exhaust valve 37 and moves it to release position. It moves it easily, for two reasons. First, the piston is in motion when it engages the valve and, second, the valve is seated only by the bow-spring 43 and whatever pressure may be present in the brake cylinder. If the pressure differential acting to shift piston 29 toward release is low, the pressure tending to seat the valve 37 will be correspondingly low, and the friction of the valve will be small. Assuming that, contrary to intention, the valve 46a should stick in an open position, and that the piston 29 should thereafter move in a releasing direction, it is apparent that the valve 46a would be struck by the drive pin 49 and in that way forced into motion.

While the invention might be variously embodied, I prefer the construction shown, because it permits the conversion of existing valves by the substitution of a minimum number of inexpensive parts, and because it permits the manufacture of the improved type of valve using castings and machining operations which at present are standard.

What is claimed is,—

1. A distributing valve comprising in combination an equalizing portion; an application piston subject to opposing pressures, one of which is brake cylinder pressure and the other is a pressure controlled by said equalizing portion; a brake cylinder exhaust valve actuated by said piston; a slide valve controlling admission of air to the brake cylinder, said slide valve having a lost motion connection with said application piston; and a yielding stop urging said slide valve in a closing direction.

2. A distributing valve comprising in combination an equalizing portion; an application piston subject to opposing pressures, one of which is brake cylinder pressure and the other is a pressure controlled by said equalizing portion; a brake cylinder exhaust valve actuated by said piston; a slide valve controlling admission of air to the brake cylinder, said slide valve having a lost motion connection with said application piston; a yielding stop urging said slide valve in a closing direction; and means for limiting the motion of said stop so that after closing said slide valve it ceases to react thereagainst.

3. A distributing valve comprising in combination an equalizing portion; an application piston, subject to opposing pressures, one of which is brake cylinder pressure and the other is a pressure controlled by said equalizing portion; a brake cylinder exhaust valve of the slide type actuated by said piston with lost motion; a slide valve controlling admission of air to the brake cylinder, said admission slide valve having a lost motion connection with said application piston, the lost motion between said piston and each of said slide valves being substantially less than the range of motion of said piston; and yielding means urging the admission slide valve in a closing direction through a limited range.

4. A distributing vave comprising in combination an equalizing portion; an application piston, subject to opposing pressures, one of which is brake cylinder pressure and the other is a pressure controlled by said equalizing portion; a brake cylinder exhaust valve of the slide type actuated by said piston with lost motion; a slide valve controlling admission of air to the brake cylinder, said admission slide valve having a lost motion connection with said application piston; a yielding stop adapted to urge said slide valve in a closing direction; and means for limiting the motion of said yielding stop so that after it has closed said valve it ceases to react thereagainst.

5. The combination defined in claim 2, further characterized in that the lost motion of said admission valve relatively to said piston, and the port dimensions are so chosen that if the yielding stop should fail to move the admission slide valve to closed position, said piston would shift said valve positively to closed position before said exhaust valve reaches open position.

6. The combination defined in claim 4, further characterized in that the lost motion of said exhaust and admission valves relatively to said piston, and the port dimensions are so chosen that if the yielding stop should fail to move the admission slide valve to closed position said piston would shift said valve positively to closed position before shifting said exhaust valve to open position.

7. Means for converting a distributing valve of the type in which an inlet slide valve is positively actuated by a drive pin connected with an application piston, and in which the inlet slide valve is housed in a removable cover, comprising a slide valve capable of being substituted for the original slide valve and of having a lost motion connection with said drive pin; a cover capable of being substituted for the original cover; and a yielding stop carried by said substitute cover and adapted to coact with the substitute slide valve, to shift the same to closed position.

8. Means for converting a distributing valve of the type in which an inlet slide valve is positively actuated by a drive pin connected with an application piston, and in which the inlet slide valve is housed in a removable cover, comprising a slide valve capable of being substituted for the original slide valve and of having a lost motion connection with said drive pin; a cover capable of being substituted for the original close; a yielding stop carried by said substitute cover and adapted to coact with the substitute slide valve; and means for limiting the motion of said yielding stop, the stop being arranged to shift said slide valve to closed position independently of the application piston, and being so limited in its motion as to cease acting upon said valve after the latter arrives in closed position.

9. The combination with the application piston of a distributing valve, of an exhaust slide valve and an inlet slide valve, both having lost motion connection with said piston, the piston serving to move the exhaust valve in both directions, and capable of moving the admission valve in both directions; and yielding means urging said admission valve from open to closed position independently of the action of said piston.

CHARLES A. CAMPBELL.